Figure 1:
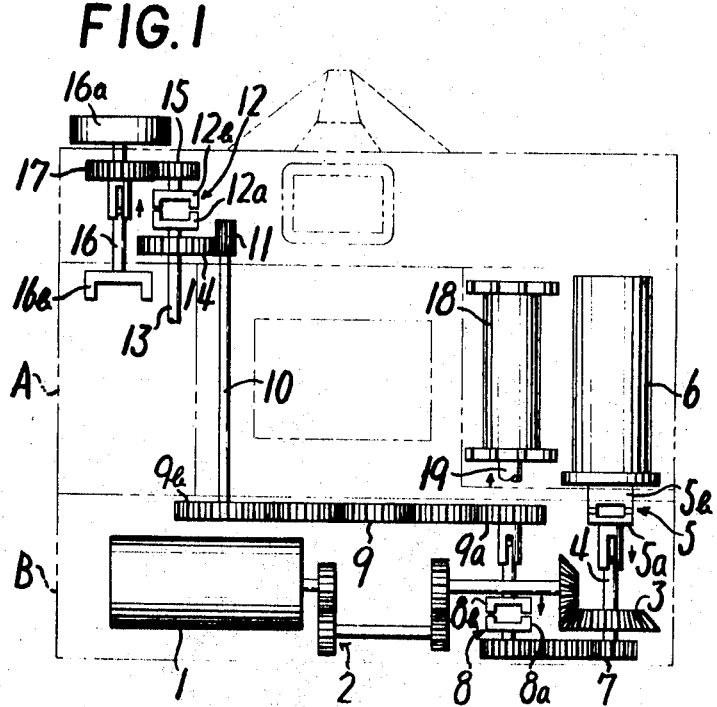

United States Patent

Umeda

[15] 3,659,805

[45] May 2, 1972

[54] MOTOR-DRIVEN DEVICE FOR FILM WINDING OR REWINDING

[72] Inventor: Kaoru Umeda, Sakai, Osaka, Japan

[73] Assignee: Minolta Camera Kabushiki Kaisha, Minami-ku, Osaka, Japan

[22] Filed: Aug. 19, 1969

[21] Appl. No.: 851,266

[30] Foreign Application Priority Data

Sept. 27, 1968  Japan..................................43/84885

[52] U.S. Cl...............................242/201, 74/665, 352/166
[51] Int. Cl......................................B11b 15/32, G03b 1/04
[58] Field of Search..................................242/201–205, 208; 74/665; 352/166, 168, 173, 187

[56] References Cited

UNITED STATES PATENTS

| 3,090,573 | 5/1963 | Matovich, Jr. | 242/202 |
| 2,604,271 | 7/1952 | Moomaw | 242/205 |
| 2,907,531 | 10/1959 | Badgley | 242/205 |

*Primary Examiner*—Leonard D. Christian
*Attorney*—Stanley Wolder

[57] ABSTRACT

A motor-driven device for winding or rewinding a film in a camera comprises first and second rewinding clutches provided respectively at the initial and terminal portions of a film rewinding drive system and a lever mechanism. Upon the actuation of an operating member the rewinding clutches are simultaneously brought into engagement while a winding clutch and a clutch in a sprocket gear are disengaged, and upon the release of the member the rewinding clutches are disengaged while the latter clutches are brought into engagement. Thus, the rewinding action transmitting system can be left independent of the film winding drive system during film winding operation.

7 Claims, 2 Drawing Figures

Patented May 2, 1972 3,659,805

Inventor
Kaoru Umeda
By Stanley Wolder
Attorney

MOTOR-DRIVEN DEVICE FOR FILM WINDING OR REWINDING

The present invention relates to a motor-driven device for winding or rewinding a film to be used in a motor-driven roll film camera.

The motor-driven film winding or rewinding device in a conventional camera is provided with a claw clutch for transmitting the rotation to the rewinding system only in one direction to merely reverse the direction of film-winding rotation of the motor when initiating rewinding operation, and during winding operation a transmission system for delivering the torque of the motor to the rewinding shaft is also driven in operative relationship therewith. Another clutch is also provided in a transmission system which associates the motor to a take-up shaft and winding or rewinding operation is effected by bringing these two clutches into engagement or disengagement. Even in this case, the rewinding action transmitting system, during winding operation, is kept in idle rotation by the film being wound up although the clutch in the rewinding system is disengaged. In either case, the rewinding action transmitting system is thus rotated during winding operation, so that the resistance torque produced by the rotation of the rewinding action transmitting system acts on the motor.

On the other hand, in case where the camera is provided with a rewinding knob in an upper portion and a motor for film transport in a lower portion, the knob is positioned remote from the motor shaft and the rewinding action transmitting system becomes more complex. In case where marked deceleration is effected in the rewinding action transmitting system, the structure such as above-mentioned in which this system is driven in operative relation with winding operation is disadvantageous in that the operation requires greater power since rotational resistance of the transmission system is loaded in addition to the winding torque. With a camera for taking photographs successively at high speed, in particular, this disadvantage must be eliminated, because the above-mentioned load of winding operation is detrimental to easy operation and serviceability of the camera.

An object of the present invention is to provide a device in which in addition to a clutch for transmitting the torque of drive shaft of the motor either to the winding system or to the rewinding system, there is provided another clutch on the rewinding shaft in the rewinding system or on a rotary shaft disposed proximate to the shaft so that the rewinding action transmitting system may be driven only during rewinding operation and the system unnecessary to winding may be kept at rest during winding operation to thereby eliminate excess rotational resistance to be otherwise loaded on the motor when the film winding is effected and make a motor-driven roll film camera by far serviceable and easier to use.

By employing the structure described above, the present invention provides a highly efficient film winding device which enables the user to take at very short intervals photographs for analyzing the movement, for example, of a moving subject.

Figure 2:
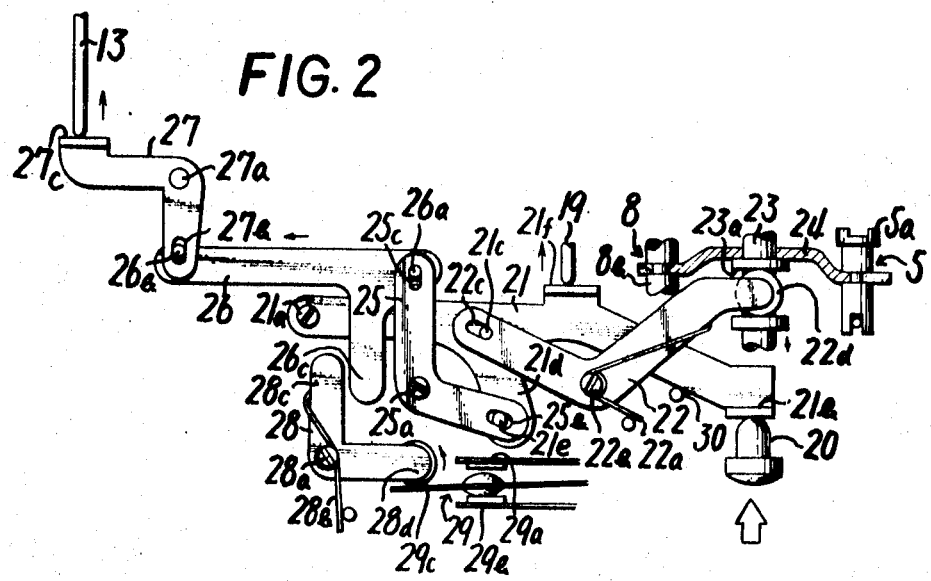

FIG. 1 is a front view showing an embodiment of a transmission system in accordance with the present invention comprising gears, clutches, etc. ; and FIG. 2 is a schematic diagram showing an embodiment of clutch actuating mechanism and switching system for the above embodiment.

Referring to the drawing, designated at 1 is a motor housed in a gear compartment B in a lower portion of a camera main body A and adapted to drive a main shaft 4 through a reduction gear system 2 and a bevel gear system 3. The main shaft 4 is provided, at its end, with the driving part 5a of a winding clutch 5 which is movable in axial direction and the driven part 5b of the clutch is fixed to a spool 6. When the film is to be wound up, the driving part 5a of the clutch is brought into engagement with the driven part 5b to drive the spool. At the other end of the main shaft 4 there is disposed a gear system 7 for driving the driving part 8a of a first rewinding clutch 8 and the driven part 8b is attached to a first gear 9a in an intermediate reduction gear system 9 for transmitting rewinding action so as to be movable only in its axial direction. The terminal gear 9b in the intermediate reduction gear system 9 has a shaft 10 extending to an upper portion of the main body A and carrying a gear 11 of a large thickness fixed to its upper end. The gear 11 is in meshing engagement with a gear 14 fixedly mounted on a shaft 13 of the driving part 12a of a second rewinding clutch 12, the arrangement being such that, the gear 11 is retained in meshing engagement with the gear 14. Although the shaft 13 and gear 14 are adapted for axial movement together with the driving part 12a of the second rewinding clutch 12. Thus, the driving part 12a is adapted to be engaged with or disengaged from the driven part 12b of the second rewinding clutch 12. A gear 15 mounted on the driven part 12b meshes with a gear 17 mounted on a rewinding shaft 16 so that when engagement is effected respectively in the first rewinding clutch 8 and the second rewinding clutch 12 the rewinding shaft 16 may be driven in rewinding direction, while the clutch 12 may be disengaged during winding operation. By providing the clutch 12 near the rewinding shaft as described above, the intermediate reduction gear system 9, terminal gears 11 and 14 to be driven during winding operation are left out of operation to minimize the load. The rewinding shaft 16 has an upper end provided with a knob 16a to be operated for loading or unloading the film and a lower end carrying a hook 16b to engage with or to be disengaged from a film take-up spool of a cartridge, the shaft 16 thus being adapted only for axial movement relative to the gear 17 upon the loading or unloading of film. Designated at 18 is a sprocket gear for restricting the feed of film to one frame of film by a conventional means when the film is wound up. During film rewinding operation, the shaft 19 is pushed up by a mechanism to be described later to release a clutch mechanism (not shown) provided within the cylindrical body of the sprocket gear 18 so as to allow the sprocket to rotate idly.

FIG. 2 illustrates a lever mechanism for effecting engagement or disengagement of the above-mentioned clutches 5, 8, 12 and the clutch in the sprocket gear 18. The end within the camera of a push button 20 outwardly projecting from the main camera body A is brought, by the action of a spring 22a to be described later, into contact with the bent end portion 21b of a main lever 21 whose base portion is pivoted at 21a to the main body A. A pin 21c provided at an intermediate portion of the main lever 21 is engaged with a slot 22c formed at the tail end of a first actuating lever 22 pivoted at 22b to the main body A. A roller 22d mounted at the forward end of the first actuating lever 22 is engaged with a groove 23a in a shaft 23 adapted for vertical movement parallel to the axes of the winding clutch 5 and the first rewinding clutch 8. By means of a spring 22a, the first actuating lever 22 is urged in counterclockwise direction in the drawing, the resultant counter force causing the main lever 21 to abut against the limit pin 30.

Fixed to the vertically movable shaft 23 is a clutch acuating member 24 whose opposite ends carry the driving part 5a of the winding clutch 5 and the driven part 8b of the first rewinding clutch 8 respectively, the arrangement being such that the upward movement of the shaft 23 effects the engagement of the winding clutch 5 while disengaging the first rewinding clutch 8 and that the winding clutch 5 is disengaged and the first rewinding clutch 8 is in turn engaged by the downward movement of the shaft.

The main lever 21 is further provided with an actuating arm 21d which carries a pin 21e at its end. The pin 21e is engaged with a slot 25b at an end of an intermediate lever 25 formed in the shape of a bell crank and mounted on the main body at a pivot 25a. The other end of the intermediate lever 25 has a slot 25c which receives therein a pin 26a mounted on the tail end of a link 26. A pin 26b disposed at the forward end of the link 26 is engaged with a slot 27b at the tail end of a second actuating lever 27 formed in the shape of a bell crank and pivoted on the main body at 27a. The lower end of shaft 13 of driving part 12a of the second rewinding clutch 12 rests on the bent end portion 27c of the lever. Therefore, the shaft 13 when pushed up by the lever 27 causes the second rewinding clutch 12 to engage, and when moved downward the shaft allows the clutch 12 to disengage.

The main lever 21 is further provided with a bent portion 21f for receiving the lower end of a shaft 19 for engaging or disengaging the clutch disposed within the sprocket gear 18 so that the clutch may be disengaged when the main lever 21 is pushed by the push button 20 and the clutch may be engaged upon the lever 21 being returned to the original position under the action of the spring 22a.

The link 26 is formed with a switch actuating arm 26c in facing relationship with an engaging portion 28c of a switch actuating lever 28 in the form of a bell crank which is urged in the clockwise direction by a spring 28b and pivoted at 28a to the main body. The forward end 28d of the switch actuating lever 28 is in contact with a movable contact member 29c of a circuit-changing switch 29 for changing the electrical circuit of the motor 1 to effect winding or rewinding operation. A contact 29b serves as a contact which is normally closed under the action of the spring 28b to rotate the motor 1 in normal direction and when the switch actuating lever 28 is pivotally moved in the counterclockwise direction the contact 29b is opened to close the contact 29a and form a rewinding circuit (not shown) connected to the motor 1.

In accordance with the structure described above, the push button, when pressed on as indicated by an arrow in FIG. 2, moves the main lever 21 in counterclockwise direction to move the first actuating lever 22 in clockwise direction and to pivot the intermediate lever 25 in counterclockwise direction, whereupon the link 26 is urged leftward to turn the second actuating lever in clockwise direction.

Accordingly, the main lever 21 pushes up the shaft 19 of the sprocket gear 18 by the bent portion 21f and disengages the clutch within the sprocket cylinder to thereby allow the sprocket gear 18 to rotate idly. The first actuating lever 22 lowers the clutch actuating member 24 and disengages the winding clutch 5 while effecting the engagement of the first rewinding clutch 8. By the bent end 27c, the second actuating lever 27 pushes up the shaft 13 and engages the second rewinding clutch 12. The link 26 moves the switch actuating lever 28 in the counterclockwise direction with the switch actuating arm 26c in pressing contact with the engaging portion 28c and the movable contact member 29c of the circuit-changing switch 29 moves off the contact 29b into contact with the contact 29a. Thus, the rewinding circuit is formed and through the reduction gear system 2, bevel gear system 3, main shaft 4, gear system 7, first rewinding clutch 8, intermediate reduction gear system 9, shaft 10, thick gear 11, gear 14, second rewinding clutch 12, and gears 15, 17, the rewinding shaft 13 is rotated in the film rewinding direction to rewind the film.

On the other hand, when the push button 20 is released, the main lever 21 is moved back clockwise into contact with the limit pin 30 by the action of the spring 22a acting on the first actuating lever 22. Simultaneously, the link 26 is moved rightward through the intermediate lever 25 and the second actuating lever is turned in the counterclockwise direction to return the above-mentioned members respectively to the original positions shown in FIG. 2. As a result, the shaft 19 of the sprocket gear 18 is returned downward to effect the engagement of the clutch in the sprocket gear 18 and the clutch actuating member 24 is moved up to effect the engagement of the winding clutch 5 and disengagement of the first rewinding clutch 8. The shaft 13 of the driving part 12a of of the second rewinding clutch 12 also disengages the clutch 12. The rightward movement of the link 26 returns the switch actuating lever 28 in the clockwise direction under the action of the spring 28b and moves the movable contact member 29c of the circuit-changing switch 29 off the contact 29a into contact with the contact 29b to form the electrical circuit of the motor 1 for winding operation. Accordingly when exposure has been made upon shutter release, the unillustrated control circuit of the motor 1 brings the motor 1 into rotation and winds up one frame of the film. During this winding operation, the rotation of the motor 1 is delivered to the spool 6 through the reduction gear system 2, bevel gear system 3, main shaft 4 and winding clutch 5. In this operation in accordance with the present embodiment, although the gear system 7 is driven by the motor 1 and the rewinding shaft 16, gears 17, 15 are rotated by the film which is being wound up, both of the first and second rewinding clutches 8, 12, now disengaged, leave the intermediate reduction gear system 9, shaft 10, thick gear 11, gear 14, shaft 13 independent of the driving system of winding operation, with the result that during film winding operation, the rotational resistance due to the frictional engagement in the intermediate reduction gear system is not added to the winding torque, wear in the tooth tips and gear shafts can be minimized, and rapid winding operation is ensured. The present device which enables the user to make successive exposures without losing right chances to release the shutter, is advantageous in that photographs of a moving subject can be taken by which it is possible to analyze the movement with greater ease and reliability.

What I claim is:

1. A motor driven film transporting device comprising a drive motor; a transmission driven by the drive motor; a film winding-up member; a first alternatively engaging clutch means interposed between the transmission and the winding-up member; an intermediate transmission; a second alternatively engaging clutch interposed between the first clutch and the intermediate transmission; a film rewinding member; a third alternatively engaging clutch interposed between the intermediate transmission and the rewinding member; and transfer means for selectively engaging the first clutch or the second and third clutches.

2. A motor driven film transporting device as set forth in claim 1 wherein the transfer means comprises a manually movable main lever; a first operating member which follows the main lever to alternatively connect the first clutch and disconnect the second clutch or disconnect the first clutch and connect the second clutch; an intermediate means; and a second operating member which follows the main lever to connect and disconnect the third clutch through the intermediate means.

3. A camera winding and rewinding mechanism comprising a drive motor (1), a rotatable film winding member (6), a rotatable film rewinding member (16), first means for connecting said motor to said winding member comprising a first clutch (5) including a first clutch drive section (5a) coupled to said motor and a first clutch driven section (5b) coupled to said winding member, second means for connecting said motor to said rewind member and comprising a second clutch (8) including a second clutch drive section (8a) coupled to said motor and a second clutch driven section (8b) and a third clutch (12) including a third clutch driven section (12a) coupled to said second clutch driven section and a third clutch driven section (12b) coupled to said rewind member, each of said clutches being transferable between engage and disengage conditions, and means (21 – 27) for alternatively engaging said first and disengaging said second and third clutches or disengaging said first and engaging said second and third clutches.

4. The mechanism of claim 3 including a gear train transmission (2, 3) connecting said drive motor to said first clutch driven section.

5. The mechanism of claim 3 including a gear train transmission (7) connecting said first and second clutch drive sections.

6. The mechanism of claim 3 including a gear train transmission (9, 11, 14) connecting said second clutch driven section and said third clutch driven section.

7. The mechanism of claim 3 including a first gear train transmission (2, 3) connecting said motor and said first clutch driven section, a second gear train transmission (7) connecting said first and second clutch drive sections, and a third gear train transmission (9, 11, 14) connecting said second clutch driven section and said third clutch drive section.